United States Patent [19]

Thatcher et al.

[11] Patent Number: 4,590,347
[45] Date of Patent: May 20, 1986

[54] INDUCED CURRENT HEATING PROBE

[75] Inventors: Gordon Thatcher, Lymm; Barry G. Ferguson, Warrington; John P. Winstanley, Lymm, all of England

[73] Assignee: United Kingdom Atomic Energy Authority, London, England

[21] Appl. No.: 548,824

[22] Filed: Nov. 4, 1983

[30] Foreign Application Priority Data

Nov. 12, 1982 [GB] United Kingdom ............ 8232386

[51] Int. Cl.[4] .................................... H05B 6/38
[52] U.S. Cl. .................... 219/10.49 R; 219/10.79; 219/10.43; 219/8.5; 219/10.57; 336/61; 336/219
[58] Field of Search .......... 219/10.79, 10.49 R, 219/10.43, 8.5, 9.5, 10.57, 10.75, 85 A, 7.5, 10.51; 336/61, 212, 221, 233, 234, 219

[56] References Cited

U.S. PATENT DOCUMENTS

| 2,510,942 | 6/1950 | Albertson, Jr. | 219/10.79 |
| 2,810,054 | 10/1957 | Jones | 219/10.79 X |
| 3,406,271 | 10/1968 | Cachat et al. | 219/8.5 |
| 3,492,453 | 1/1970 | Hurst | 219/10.49 R |
| 3,590,201 | 6/1971 | Basinger | 219/8.5 |

Primary Examiner—Philip H. Leung
Attorney, Agent, or Firm—William R. Hinds

[57] ABSTRACT

An induced current heating probe is of thimble form and has an outer conducting sheath (30) and a water flooded flux-generating unit formed from a stack of ferrite rings (10) coaxially disposed in the sheath. The energizing coil (14) is made of solid wire which connects at one end (16) with a coaxial water current tube (15) and at the other end (17) with the sheath. The stack of ferrite rings (10) may include non-magnetic insulating rings (11) which help to shape the flux.

5 Claims, 8 Drawing Figures

INDUCED CURRENT HEATING PROBE

This invention relates to induced current heating probes.

BACKGROUND OF THE INVENTION

The invention has arisen in the course of investigation into improved methods of brazing an inner metal repair tube to an outer metal leaking tube by a heating probe which is entered into the repair tube.

There is currently a problem in the nuclear field, and probably in other fields, where a leak between a tube in a nest of tubes and a tube plate has to be made good without gaining access to the outside of the tube. The practice for dealing with this problem is to insert a short length of repair tube into the leaking tube through the tube plate with one (the outer) end of repair tube explosively welded to the tube plate and the other (the inner) end brazed to the leaking tube.

To effect the braze (which may typically have to be made 10 cms inside a 2.3 cm diameter repair tube) it has further been the practice to construct an induction heating probe which has a water-cooled RF energised coil of about six turns embedded in an insulant. The coil is located to correspond in position with the braze region and when powered, a braze is effected by induced current heating. This practice has created problems of a magnitude justifying a search for improvements.

One problem arises from the bulkiness of the probe. Whilst the coil of the probe is a relatively small item (when used for example with a 2.3 cm diameter tube) it has to carry a transformer which may typically weigh 25 Kg. This is necessary as a large KVA is required (eg 200 volts at 1000 amps) to effect the braze and for power loss reasons this has to be transmitted at lower amperage (eg 100 amps) from an RF generator to a tube repair site. A further problem is the low quality of the braze (as measured by the area at which a bond is effected) and the minimum leak barrier provided by the bond. This is thought to be created in part by uneven distribution of input powers at the braze and haphazard heat exchange relationships whereby the braze alloy can be fused but, by virtue of one of the tubes not receiving adequate heating or being cooled in certain regions, those regions act to solidify the braze alloy without wetting. On the other hand local overheating can give rise to metallurgical problems.

There is also a cooling problem. It is difficult to pass enough water through the water cooled RF energised coil. To meet this problem pre-cooled water is used but this is an inconvenience and expense. There also has to be cooling of a metal sheath which lies above the RF energised coil. This is performed by specially shaping one of the water carry leads to the coil to have a kidney shape in cross-section so that it can be held against the sheath. This is again an inconvenience and expense.

FEATURES AND ASPECTS OF THE INVENTION

The present invention is based on the use of some and preferably all of the concepts of:

(a) Lowering the power input frequency (typically to the top of the AF range) to the probe to give a more even penetration into the braze whilst allowing the use of a metal sheath for the probe both above and in the coil region so that the sheath can function as a return conductor to give a greater cross-section for water flow.

(b) Using a water flooded ferrite stack with a coil winding which does not have to be water conducting. Typically the coil is made from a solid 0.7 mm diameter wire and this is very compact, more turns can be included, and a higher inductance provided.

(c) Selectively including non-magnetic spacers in the ferrite stack to generate a preferred coupling profile between coil and workpieces being brazed with the object of providing a uniform temperature in the workpieces.

(d) Using a metal sheath for the probe which extends over the coil and is usable as both a conductor for cooling water and for alternating current so that a coaxial form of probe is set up with more uniform circular distribution of temperature in the workpieces and with the water acting as insulator.

These concepts interact and offer the following additional advantages:

(i) A transformer at the probe is no longer required.

(ii) A uniform temperature distribution at the workpiece reduces risks of overheating with consequent metallurgical or braze damage.

(iii) Simple construction, symmetrical construction and heat input, minimum heat generation in the sheath from inductances in the electrical cables to the coil, low weight, adequate cooling without water pre-cooling, and avoiding the need for embedded insulant.

The invention is stated broadly as an induced current heating probe of the kind which can be entered into a tube to effect a braze at an external circumferential region of said tube: characterised in that the probe has an external sheath which serves as both an electrical and cooling water conduit, has a flux-generating unit in the form of a stack of ferrite cores with an energising winding which may be located centrally in the sheath, and has a coaxial tube which also serves as both an electrical and cooling water conduit; the assembly of sheath, flux-generating unit and coaxial tube being such that they accept series flow of both current and water with the flux generating unit flooded with the water flow.

A probe according to the invention will now be described further with reference to the accompanying drawings in which:

DESCRIPTION OF THE PREFERRED EMBODIMENTS

Figure 2:
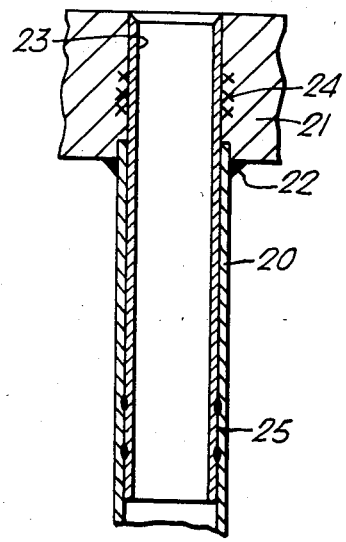
FIG. 2 shows a sectional elevation of a tube repair to be effected.

FIG. 2 shows the repair work to be performed. It is assumed that a tube 20 in a nest of closely spaced similar parallel tubes in a tube plate 21 is leaking at the weld 22. To close off this leak a repair tube 23 is inserted into the leaking tube 20 through the tube plate. The upper end of tube 23 is explosively welded to the tube plate at a region 24 (indicated by crosses) and the lower end of tube 23 is brazed to the tube 20 at a region 25. This represents the position encountered both in the art and the present invention. FIG. 2 could typically represent a part of a heat exchanger as used to separate sodium and water/steam in a sodium-cooled nuclear reactor steam generator.

Figure 3:
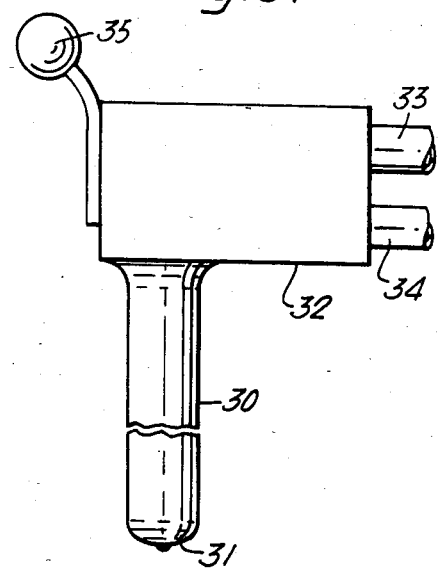
FIG. 3 shows an elevation of the probe according to the invention to effect a braze in the repair of the leaking tube of FIG. 2.

FIG. 3 shows in general outline a probe according to the invention. The components shown are an external stainless steel sheath 30, with a closed end 31, a service box 32, water conducting cables 33, 34 and a handle 35.

Externally this differs in appearance from the known probe in that, in the known probe, a massive transformer is required in conjunction with the service box 32 (which makes the probe difficult to transport and manipulate); and the sheath terminates at an open end from which a flux-generating coil, in the form of a water carrying conductor embedded in insulant, projects. Such a coil is exposed to damage, has a very restricted water flow path and is very limited in its inductance.

Figure 1:
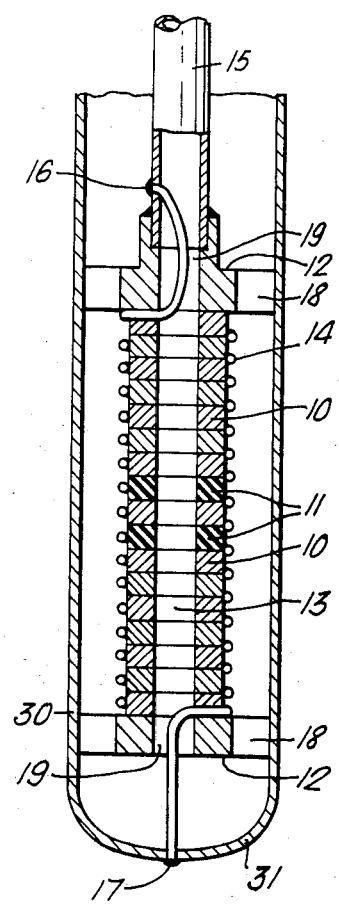
FIG. 1 shows a sectional elevation of the flux generating unit end of a probe.
Figure 7:
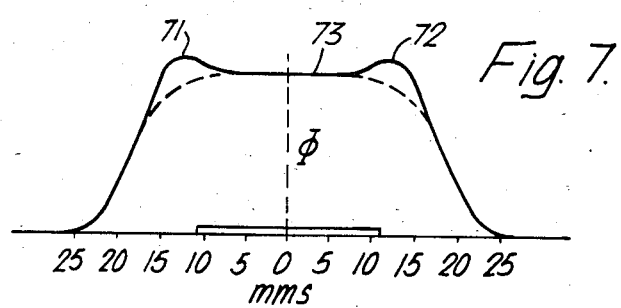
FIG. 7 is a graph giving flux distribution at the braze.
Figure 8:
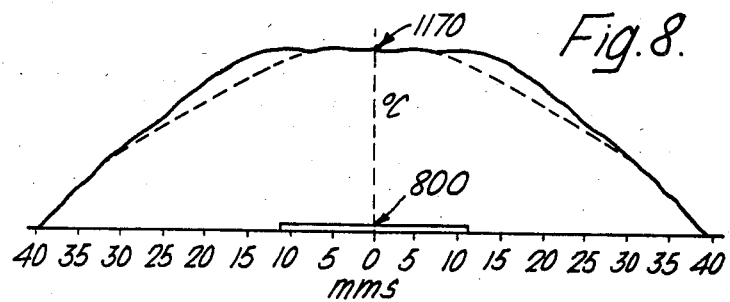
FIG. 8 is a graph giving temperature distribution at the braze.

In FIG. 1 there is shown, to a larger scale, the lower end of the sheath 30 with its closed end 31. Inside the sheath 30 there is a flux-generating unit comprising a stack of ferrite cores 10 of ring shape with similar shaped non-magnetic insulating cores 11 and end spiders 12. Items 10, 11 and 12 are held together with adhesive and define a central passage 13. An energising winding 14 of 0.7 mm diameter solid wire is provided on the cores 10, 11. The upper end of the winding 14 passes along the passage 13 and through a coaxial conductor tube 15 where it terminates at a spot weld 16. The lower end of the winding 14 passes along the passage 13 and through the end 31 when it terminates at a weld 17 and is kept at earth potential. The items 10, 11, 12 and 14 form the flux generating unit. In the stack of cores there are, starting from the top, seven ferrite cores 10, one insulating core 11, one ferrite core, one insulating core and seven ferrite cores. This gives a flux distribution as shown in FIG. 7 with end humps 71, 72 and a flat temperature distribution in the region of the braze as shown in FIG. 8. The spiders 12 have arms 18 as well as bores 19.

Water flow through the probe is inwardly along cable 33, through the coaxial tube 15, through the top spider 12 along the passage 13, through the bottom spider 12 and into the bottom of the sheath 30. Flow is then upwardly along the sheath 30 through the spiders 12 and into the cable 34. It is seen that the flux generating unit is flooded with water. Flow could take place in the opposite direction.

Current flow through the probe is, like the water flow, serially through cable 33, tube 15, flux generating unit, sheath 30 and cable 34. Insulation is provided predominantly by the cooling water. Whilst the cables 33, 34 tend to be of the same dimensions as similar cables used in prior art arrangements the overall impedance to water flow is less, the water moves in a superior heat transfer path, and the water has less heat to remove. Mains water can be used for most purposes without pre-cooling or pre-treatment.

Figure 4:
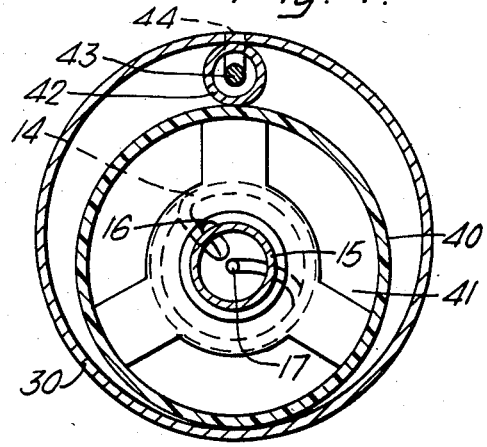
FIG. 4 shows a cross-sectional view of an alternative form of probe.

FIG. 4 which is drawn to a larger scale than that of FIG. 1, shows a modification to the probe of FIGS. 1 and 3. There is some loss of the true coaxial disposition but this does not seriously affect performance. The probe of FIG. 4 has an outer sheath 30 (as in FIG. 1) and a stack of cores 10/11 with a coil 14 (as in FIG. 1). The stack of cores 10/11 and coil 14 are supported in a cylinder 40 of insulating material with a top cover 41 into which the tube 15 (no longer precisely coaxial) is secured. Between the cylinder 40 and sheath 30 there is a capillary tube 42 containing an optical fibre 43. The capillary acts both as a spacer for cylinder 40 in sheath 30 and as a conduit for the fibre 43. The fibre 43 passes to a window 44 in the sheath 30. Water flow along the sheath now takes place along a path of crescent shape in the region of the cylinder 40.

Figure 5:
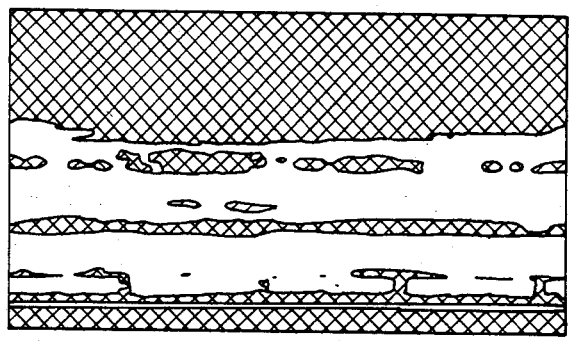
FIG. 5 shows, for comparative purposes, an ultrasonic C-scan of a braze made with the prior art probe.
Figure 6:
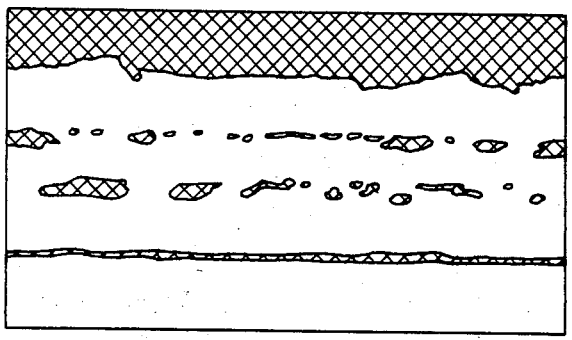
FIG. 6 shows an ultrasonic C-scan of a braze made with a probe according to the invention.

In FIGS. 5 and 6 an ultrasonic C-scan of a typical prior art (FIG. 5) braze can be compared with an inventive braze (FIG. 6). The cross-hatched parts represent areas not fully bonded by the braze. It is seen that the total area of the cross-hatched parts is larger in FIG. 5 than in FIG. 6. This is an indicative test but the true quality of the braze is represented by the measurement of what is termed the "minimum leak barrier". In FIG. 5 (and similar prior art brazes) this measurement (for a given braze length of 25 mm) tends to be about 11 mm. In the inventive brazes, for the same braze length, this measurement tends to be about 20 mm.

FIG. 7 has already been referred to above. It shows (continuous line) the derivation of a flux pattern having end humps 71, 72 and a flat valley 73. This pattern is thought to be repeated fairly uniformly in all 'vertical' planes, intersecting on the axis of the probe. The prior art flux pattern differs as shown by the dash line and is not though to have the same uniformity on corresponding "vertical" planes.

In a somewhat similar manner FIG. 8 shows (continuous line) the heat distribution at a braze made by the invention whilst the dash line shows a comparison with a prior art braze. A typical braze temperature is 1170° C. and it is advantageous to have the temperature uniform in the braze region. In both FIGS. 7 and 8 the vertical dash line represents the centre region of the braze and the double line on the bases represents the length of the braze. The horizontal azis gives the distance from the centre region of the braze in millimeters. In FIG. 7 the vertical axis is representative of flux and in FIG. 8 the vertical axis is representative of temperature.

The prior art probes typically uses RF frequencies of 300 KHz whilst the probe of the present invention is tuned to operate at the top end of the AF range, namely about 20 KHz. Thus skin effects on conductors are much lower and high amperage powers can be conducted without intolerable heat losses in connectors. At the same time a more even transfer of power to the tubes is obtained.

A typical braze (FIG. 6) was brought up to braze temperature of 1170° C. in 1 min 15 secs at a power of 4.9 Kw into the tank circuit of the power generator. The temperature of 1170° was held at 2.7 Kw for 5 minutes.

The cooling water flow was 3.61/min and the braze is bathed in an argon/hydrogen mix flowing at 5.0 liters/min.

Whilst the invention has been described above in the context of the use illustrated in FIG. 2 it can provide other services when heating from a source internal to a tube is required.

We claim:

1. An induced current heating probe of the kind which can be entered into a tube to effect a braze at an external circumferential region of said tube, which probe has an electrically conductive external sheath closed at one end and which serves as both an electrical and cooling water conduit, has a flux-generating unit in the form of a stack of ferrite cores with a solid energising winding inside but spaced from the sheath and has a coaxial tube which also serves as both an electrical and cooling water conduit; the winding being electrically connected at one end with the coaxial tube and at the other end with the external sheath; the cores having openings defining a water flow passage through the stack; non-magnetic insulating rings between the cores in the stack; said coaxial tube communicating with the water flow passage, and the water flow passage communicating with the space between the sheath and the flux generating unit; the assembly of sheath, flux-generating unit and coaxial tube being arranged such that they accept series flow of both current and water with the flux-generating unit flooded with the water flow.

2. A probe as claimed in claim 1 in which the cores and rings are held together in the stack by adhesive and the stack has end spiders which define a bore into which said coaxial tube connects and with which said water flow passage communicates.

3. A probe as claimed in claim 1 in which the ends of the winding pass respectively through an end of the sheath and the coaxial tube and are welded externally of said sheath and tube.

4. A probe as claimed in claim 1 including an optical fibre terminating at a window in the sheath.

5. A probe as claimed in claim 4 in which said fibre is in a tube which acts as a spacer between the sheath and an insulating cylinder containing the flux generating unit.

* * * * *